United States Patent [19]

Belsky et al.

[11] 4,398,743
[45] Aug. 16, 1983

[54] VEHICLE TOWING SYSTEM

[76] Inventors: Jerome Belsky, 44 Strawberry La., Rolling Hills Estates, Calif. 90724; D. Michel Belsky, 5427 Vista Fortuna, Cypress, Calif. 90630

[21] Appl. No.: 346,933

[22] Filed: Feb. 8, 1982

[51] Int. Cl.³ .............................................. B60D 1/00
[52] U.S. Cl. ............................... 280/495; 280/490 R; 280/502; 403/378
[58] Field of Search ........................ 280/495, 496–502, 280/490 R, 504–508, 492; 172/677; 403/378, 379

[56] References Cited

U.S. PATENT DOCUMENTS

| | | | |
|---|---|---|---|
| 2,259,828 | 10/1941 | Mowers | 280/493 |
| 3,552,775 | 1/1971 | Warner | 280/492 |
| 4,266,799 | 5/1981 | Wood | 280/490 R |
| 4,280,713 | 7/1981 | Bruhn | 280/490 R |

FOREIGN PATENT DOCUMENTS 976578 10/1975 Canada ........................... 280/490 R Primary Examiner—Joseph F. Peters, Jr.
Assistant Examiner—Mitchell J. Hill
Attorney, Agent, or Firm—Ben E. Lofstedt

[57] ABSTRACT

A vehicle mounted towing system for use with tubular rear bumpers affixed to the frame of a vehicle at a height substantially above the trailer towing tang of the towed vehicle, including an anchor plate mounted to the underside of the rear bumper, a gusset attached to the top of the anchor plate and to the forward portion of the rear bumper, a bracket secured to the underside of the anchor plate and having a channel therein, one of the open ends of the channel facing the rear of the vehicle, a tongue slideably mateable with the channel in the bracket and extending therebeyond, a pin passed through matching holes in the tongue and bracket to lock the tongue in place relative to the bracket, an end plate with a lip along the top thereof secured about the rear end of the tongue, a standoff secured to the end plate and depending therefrom, a ball hitch mounting tang secured to the other end of the standoff, and a load transfer strap secured at one end to the end of the end of the standoff joined to the ball hitch mounting tang and secured at the other end to the forwardmost end of the tongue.

11 Claims, 3 Drawing Figures

VEHICLE TOWING SYSTEM

BACKGROUND OF THE INVENTION

1. Field of the Invention

The present invention relates to a vehicle towing system for vehicles with rear bumpers secured to the frame of the towing vehicle, and more particularly to frame-mounted tubular bumpers.

2. Description of the Prior Art

A substantial variety and diversity of towing devices for vehicles is found in the prior art relative to non-tubular, rear-mounted bumpers. Simply applying the towing devices and systems which were available in the prior art which were utilized with non-tubular bumpers resulted in unacceptably frequent and catastrophic failure of the towing system and resulted in an aesthetically non-pleasing installation.

Further, the massive, overly heavy bumpers used on vehicles in the past cannot, practically speaking, be used with the newer, lightweight vehicles. One of the problems confronting vehicle manufacturers and, ultimately consumers (vehicle users), is the fuel and energy crisis. For some time now, fuel costs have been fluctuating erratically with a significantly noteable upward bias due to limited petroleum and/or oil reserves, coupled with the spiraling exploration and production costs.

In order to counterbalance this undesirable situation, certain government agencies have established energy useage standards for vehicle manufacturers which must be met at various time frames. In order to meet the energy useage requirements of the United States Government for the year 1985 and beyond, the government standards require that the weight of vehicle bumpers be reduced substantially. One way to accomplish this task and meet these government-established requirements is to create effective and strong tubular bumpers. Tubular bumpers formed from high-strength, aircraft-quality aluminum metal will substantially satisfy these advance standards for energy efficient motor vehicles while providing a rugged, durable and strong bumper for motor vehicle use both on the highways and off.

SUMMARY OF THE INVENTION AND OBJECTS

The present invention is basically a bolt-on type vehicular mounted towing system for vehicles having rear-bumpers, which includes an anchor plate member welded to the underside of the rear frame-mounted bumper intermediate the ends thereof, a gusset member welded to the forward portion of the bumper and to the top portion of the anchor plate, a bracket member bolted to the anchor plate member having a longitudinally-arranged channel therein with one end of the channel exiting to the rear of the vehicle, a tongue conformable to the channel and slideably mateable therewith, a pin passed through matching holes in the tongue and bracket for locking the tongue in place relative to the bracket, an end plate with a lip along the top thereof for engagement with the end of the anchor plate and secured about the rear end of the tongue, a standoff member welded to the end plate and depending therefrom, a ball hitch mounting tang secured to the other end of the standoff member, and a load transfer strap secured at one end to the end of the standoff adjacent to where the strap is joined to the ball hitch mounting tang and secured at the other end to the forwardmost end of the tongue, and a ball hitch mounted to the ball hitch mounting tang.

It is one object of the instant invention to provide a vehicle towing means for tubular bumpers, and the like, which is removably installable to a rear bumper mounted to the trame of the vehicle, while ensuring a clean and aesthetically pleasing appearance when the removable tongue and ball hitch tang is not installed in the channel portion of the bracket.

Another important and primary object of the present invention is to provide a means for transfering the load imposed by the towed vehicle to the front and rear of the anchor plate member to distribute the loading forces more evenly throughout the towing system to prevent catastrophic failure of the towing system.

It is a still further object of the invention to provide a vehicle towing system for rear mounted vehicle bumpers wherein such towing system is suspended substantially below the rear bumper and disposed at the proper height above the ground for engaging the socket of a trailer tang while still maintaining and ensuring structural integrity of the towing system.

These and other objects, features and many of the attendant advantages of this invention will be more readily appreciated by those skilled in the art from the following description, when considered in connection with the accompanying drawings, wherein like parts in each of the several Figures are identified by the same reference character, and wherein:

DESCRIPTION OF THE PREFERRED EMBODIMENT

Figure 1:
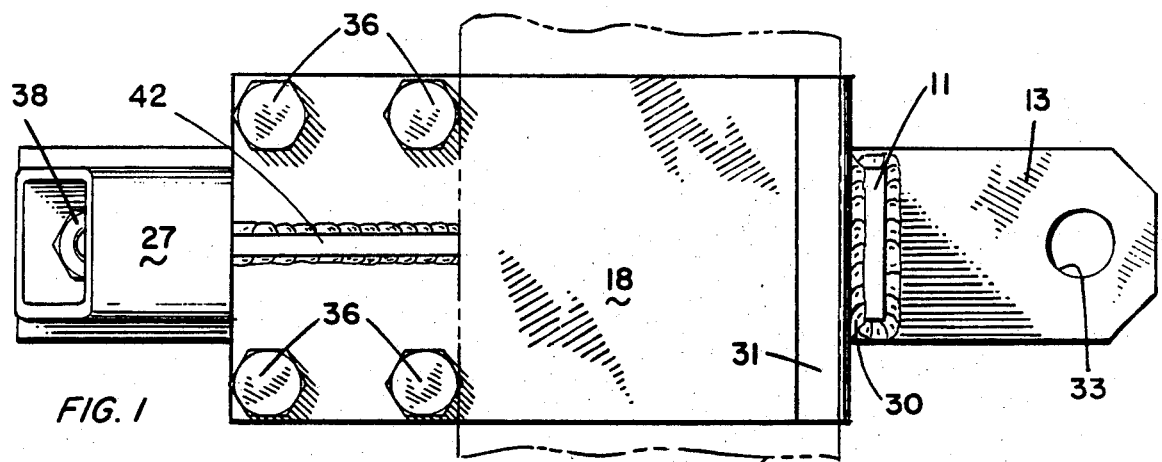
FIG. 1 is a top view of the instant invention disclosed herein.

Prior to launching into a detailed description of the present invention, it is to be clearly understood that the invention is not limited in its application to the details of construction and the arrangement of parts illustrated in the accompanying drawings, since the invention is capable of other embodiments and of being practices or carried out in various ways.

It should also be understood that the phraseology or terminology employed is for the purpose of description and not of limitation.

With continued reference now to the drawings herein, the invention is generally indicated at 10, and is referred to herein as a vehicle towing system. Basically, the vehicle towing system 10, as disclosed herein, is primarily useful in conjunction with tubular rear bumpers affixed to the frame of a vehicle at a height substantially above the trailer towing tang of the towed vehicle, such as a four wheel drive vehicle which is typically elevated above the axles of the driven wheels for ground/obstacle clearance purposes, and comprises an anchor plate member 18 mounted to the underside of the rear bumper 35, a gusset member 42 mounted to the top of the anchor plate 18 and the forward portion of the rear bumper 35, a bracket member 16 mounted to the underside of the anchor plate member 18, the bracket member 16 having a channel therein, one end of the channel 19 being open to the rear of the vehicle (not shown), a tongue member 27 slideably mateable with the channel 19 of the bracket member 16, a pin 25 passed through matching holes 23, 34 in the bracket member 16 and the tongue member 27, respectively, an end plate member 32 secured about the end of the tongue member 27, the upper portion of the end plate member 32 having a lip means 31, a standoff member 11 welded to the end plate member 32 and to the ball hitch mounting tang 13, a load transfer strap 12 one end of which is connected to the standoff member 11 and to the ball hitch mounting tang 13 and the other end being connected to the forwardmost end of the tongue member 27.

The anchor plate member 18 is typically formed of a metal plate material and has a plurality of holes 24 drilled or punched through the forwardmost end of it. The purpose of these holes 24 will be made clear as the description of the invention proceeds further hereinafter. Further, the anchor plate member 18 is typically secured to the bumper 35 by welding or the like. The gusset member 42 is typically formed of a metal plate material and is typically secured to the bumper 35 and the anchor plate member 18 by welding or the like. The bumper 35, of course, is secured to the vehicle frame (not shown).

It should be clearly noted at this time that the bumper 35 is formed of tubular metal material, preferrably, high strength, aircraft-quality aluminum, and is preferred in the practicing of the invention 10 disclosed herein. However, it should be understood that it is not intended that the invention should in any way be limited to the use of such material in the tubular bumper 35.

Further, the gusset member 42 is provided for the purpose of substantially improving the distribution of the loading forces impressed upon the anchor plate member 18 to the bumper 35. As a consequence, load/stress concentrations are reduced thereby improving the stress/load carrying ability of the overall system and improving the safety factor of the towing system.

In the typical bumper installation, the bumper 35 is mounted directly to the frame of the vehicle (not shown). In turn, the anchor plate member 18 and the gusset plate member 42 are conveniently secured to the underside of the tubular bumper 35 by welding. By such weldment, the anchor plate member 18 and gusset plate member 42 are ruggedly secured to the bumper 35 and will withstand the significant abuse it will frequently encounter in normal use.

Figure 2:
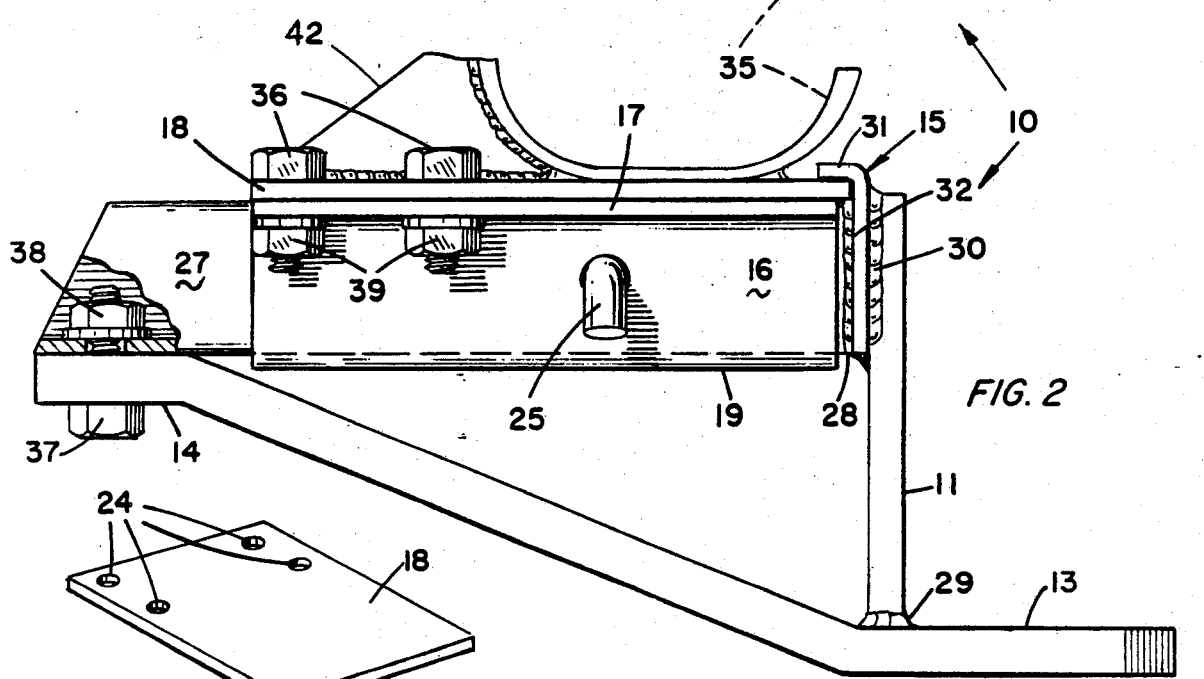
FIG. 2 is a side elevation view of the present invention shown partially in section.
Figure 3:
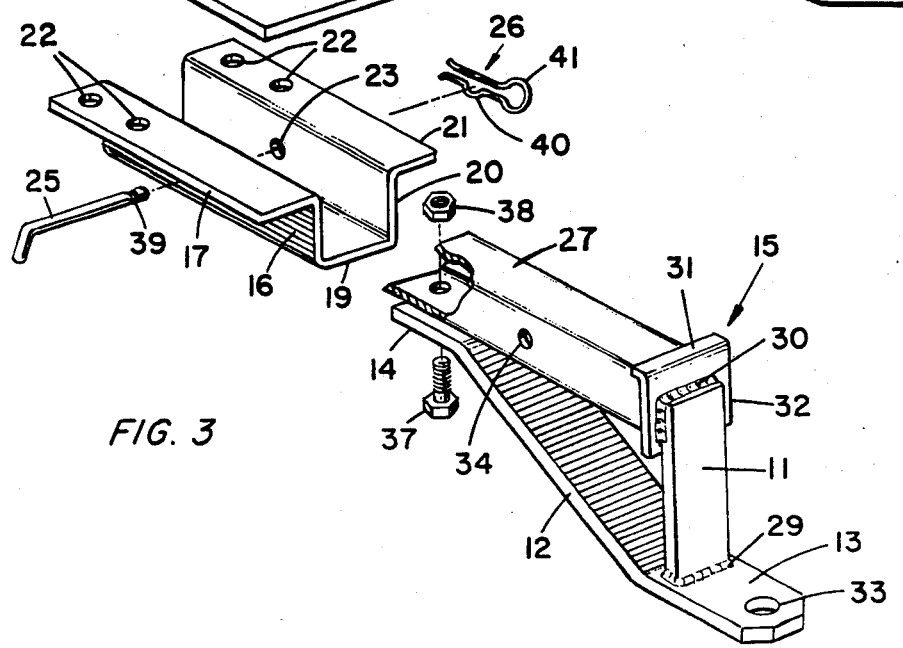
FIG. 3 is an exploded assembly view of the invention described herein.

With special emphasis now on FIG. 3, there is further shown a bracket member 16 formed of metal plate material which includes a centrally disposed and longitudinally arranged channel 19, a pair of laterally arranged flanges 17, 21, a pair of holes 23 (only one is shown) in the sidewalls of the channel 19, and a plurality of holes 22 in the flanges 17, 21. The bracket member 16 is typically secured to the bottom of the anchor plate member 18 by aligning the holes 24 in the anchor plate member 18 with the holes 22 in the flanges 17, 21. Thereafterwards, as clearly illustrated in FIGS. 1 and 2 of the Drawings, headed bolts 36 with threaded shanks are appropriately mounted through the aligned holes 22 and 24 of the anchor plate member 18 and the bracket member 16, respectively, and, thereafter, mated with nuts 39 and tightened to draw the bracket member 16 into intimate contact with the anchor plate member 18.

In order to prepare the installation for towing purposes and thereby complete the towing package, the tongue member 27 is slideably inserted into the channel 19 and beneath the anchor plate member 18. Thereafter, the tongue member 27 is moved so that the holes 34 in the tongue member 37 are in alignment with the holes 23 in the bracket member 16. Once this is accomplished, the pin 25, one end of which is bent and the other end of which has a circumferential groove 39 thereabout, is inserted into the aligned holes 23, 34 and passed therethrough until the bent end prevents any further insertion therethrough. A keeper clip 26, having an expanded, semi-circular portion 26 for insertion into and locking within the circular groove 24 of the pin 25, is then inserted into the groove 24, in order to prevent the pin 25 from being withdrawn from the holes 23, 24.

Consequently, the clip 26, effectively prevents the pin 25 from being withdrawn accidently and thereby "keeps" it in its locking position.

A finger-gripping loop 41 is provided at the extremity of the keeper clip 26 to provide a proper surface for manually grasping the clip 26 for engagement and disengagement with and from the groove 39 of the pin 25.

Once the tongue member 27 is installed within the channel 19 and the pin 26 inserted as previously indicated hereinbefore, the lip means 31 is operably disposed above the rearwardly-most end of the anchor plate member 18 and in intimate abutting contact therewith.

Further, the end plate member 32 is typically welded about the end of the tongue member 27 to form a cap covering the end thereof and to effectively present a mounting surface upon which to weld one end of the standoff 11 to rigidly secure said standoff 11 thereto. The purpose and function of the standoff 11 is to allow the tang 13 to be vertically displaced or lowered to the proper height for towing the vehicle. Such height determines a number of parameters; one of which is the vertical loading force or stress transfered by the towed vehicle to the towing vehicle and certain towing stability factors.

The opposite end of the standoff 11 is welded to the ball hitch mounting tang 13 to provide structural support for the tang 13.

It should be noted that the tang 13 contains a mounting hole 33 where a trailer hitch ball (not shown) may be mounted for towing a vehicle having a female receptacle and towing hitch secured to the front thereof.

The installation and arrangement of the present invention 10 is completed by mounting a load transfer strap 12 between the forwardmost portion of the tang 13 and the forwardmost portion of the tongue member 27. The purpose of this load transfer strap 12 is to transfer a portion of the loading forces presented by the towed vehicle to the forwardmost portions of the bracket member 16 and the anchor plate member 18 & gusset 42. This permits the towing load to be effectively distributed to the forwardmost weldment between the anchor plate member 18 and the bumper 35. The balance of the load is presented to the rearmost weldment between the bumper 35 and the anchor plate member 18 via the standoff 11 and the lip means 31 of the end plate member 32.

It should be noted that the lip means 31 provides a locking action and distributes the loading forces presented to it over a wide portion of the rearwardmost end of the anchor plate member 18 while eliminating a substantial amount of stress due to the torqueing action of the tongue member 27.

When the tongue member 27 is removed from the channel 19 of the bracket 16, the result is an extremely clean and aesthetically pleasing appearance when the towing vehicle is viewed from the rear thereof.

While we have herein show and described the preferred embodiment of the invention, it is to be understood that we do not wish to restrict the invention to the precise details of of the specific construction of the preferred embodiment may be varied without departing from the principles of our invention.

We claim as our invention:

1. A vehicle towing system for use with towing vehicles having rear bumpers secured to the vehicle frame and with towed vehicles having a forward tang for coupling a ball hitch thereto, comprising:

(a) an anchor plate member secured to the underside of the rear bumper and extending therebeyond, the forwardmost end of the anchor plate member having a plurality of holes therein and a rearwardmost end which projects beyond the place of securement to the rear bumper;

(b) a bracket member having a longitudinally arranged channel therein having a pair of oppositely disposed holes in the sides of said channel with a pair of flanges extending laterally from the top edges of the channel, said flanges having holes therein alignable with the holes in the anchor plate member;

(c) fastener means for securing the bracket member to the anchor plate member via the aligned holes therethrough;

(d) a tongue member adapted for slideably mating with the channel in said bracket member, said tongue member having aperture means transversely disposed therethrough and alignable with the holes in the sides of said channel of said bracket member so that when the forwardmost end of said tongue member is inserted into the channel said holes may be aligned;

(e) locking means insertable through the aligned holes in said sidewalls of said channel and said tongue member for locking the tongue member relative to the bracket member;

(f) an end plate member secured to the rearwardmost end of the tongue member, said end plate member having an inwardly directed lip means along the top edge thereof;

(g) a standoff member secured at one end to the end plate member and depending downwardly therefrom;

(h) a towing tang having a mounting hole therein for a ball hitch, said towing tang being secured to the bottommost end of said standoff member; and a (i) load transfer strap secured between the forwardmost end of said tongue member and the end of said towing tang secured to the standoff member.

2. The towing system for vehicles with a rear bumper of claim 1, further comprising gusset means weldedly secured to the topside of the anchor plate member and the forward portion of the bumper.

3. The vehicle towing system of claim 1 wherein said anchor plate member is formed of a metal plate welded to the underside of the rear bumper.

4. The vehicle towing system of claim 1, wherein said bracket member is formed of a single metal plate and is fastened to said anchor plate member via headed bolts with threaded shanks via said aligned holes in said anchor plate member and said flanges of said bracket member and secured thereto by threaded nuts mated to said threaded shanks of said headed bolts.

5. The vehicle towing system of claim 1, wherein said fastener means for securing the bracket member to the anchor plate member via the aligned holes therethrough, comprises a plurality of headed bolts with threaded shanks and complementary nuts.

6. The vehicle towing system of claim 1, wherein said tongue member is formed of metal shaped in a tubular fashion and is contoured to conformably nest within said channel in said bracket member.

7. The vehicle towing system of claim 1, wherein said end plate member is made of metal plate and is secured to said tongue member by welding.

8. The vehicle towing system of claim 1, said standoff member is made of metal plate and is secured to said end plate member by welding.

9. The vehicle towing system of claim 1, wherein said towing tang is made of metal plate and is secured to said standoff member by welding.

10. The vehicle towing system of claim 1, wherein said load transfer strap is made of metal plate and is formed as an extension of the towing tang.

11. The vehicle towing system of claim 1, said load transfer strap further having a hole in the forwardmost end thereof, and said forwardmost end of said tongue having a hole therein alignable with said hole in said load transfer strap, and a bolt and nut passed through said aligned holes for securing the load transfer strap to said tongue member.

* * * * *